US009394084B1

(12) United States Patent
Edwards et al.

(10) Patent No.: US 9,394,084 B1
(45) Date of Patent: Jul. 19, 2016

(54) AIRCRAFT ELECTRICAL SYSTEM OPERATING METHOD

(71) Applicant: ROLLS-ROYCE PLC, London (GB)

(72) Inventors: Huw Llewellyn Edwards, Derby (GB); Parag Vyas, Nottingham (GB)

(73) Assignee: ROLLS-ROYCE plc, London (GB)

( * ) Notice: Subject to any disclaimer, the term of this patent is extended or adjusted under 35 U.S.C. 154(b) by 237 days.

(21) Appl. No.: 14/247,708

(22) Filed: Apr. 8, 2014

(30) Foreign Application Priority Data

Apr. 11, 2013  (GB) .................................. 1306565.1

(51) Int. Cl.
| H02H 7/08 | (2006.01) |
| B65D 41/00 | (2006.01) |
| B64D 45/00 | (2006.01) |
| H02P 29/02 | (2016.01) |

(52) U.S. Cl.
CPC .............. *B65D 41/00* (2013.01); *B64D 45/00* (2013.01); *H02P 29/028* (2013.01); *B64D 2221/00* (2013.01)

(58) Field of Classification Search
CPC ............. H02P 29/02; H02P 3/00; F02K 9/38; B60R 16/03
USPC ..................................................... 318/400.21
See application file for complete search history.

(56) References Cited

U.S. PATENT DOCUMENTS

| 6,020,711 A * | 2/2000 | Rubertus | .............. | H02K 7/1823 |
| | | | | 318/254.2 |
| 6,050,243 A * | 4/2000 | Nichols | .................... | F02D 41/22 |
| | | | | 123/479 |
| 6,142,418 A * | 11/2000 | Weber | .................... | B64D 41/00 |
| | | | | 244/17.19 |
| 7,393,185 B2 * | 7/2008 | Scanderbeg | ............ | F02D 41/22 |
| | | | | 417/12 |
| 2005/0073273 A1 | 4/2005 | Maslov et al. | | |
| 2005/0237034 A1 * | 10/2005 | Patterson | ................ | F02N 11/04 |
| | | | | 322/46 |
| 2006/0087776 A1 | 4/2006 | Cullen et al. | | |

(Continued)

FOREIGN PATENT DOCUMENTS

| DE | 10 2007 048642 A1 | 4/2009 |
| DE | 10 2011 016336 A1 | 10/2012 |
| EP | 2 266 964 A | 11/1993 |

(Continued)

OTHER PUBLICATIONS

Ruba et al., "Fault Tolerant Electrical Machines—State of the Art and Future Directions," Department of Electrical Machines, Technical University of Cluj.

(Continued)

*Primary Examiner* — Erick Glass
(74) *Attorney, Agent, or Firm* — Oliff PLC

(57) ABSTRACT

A method of controlling an aircraft electrical system (40). The electrical system (40) comprises an alternating current electrical machine (56, 58) comprising a plurality of phases, each phase having a power rating, the electrical machine (56, 58) being configured to operate on failure of one or more phases. The method comprises: determining a power requirement; sensing a fault of one or more phases of the electrical machine (56, 58), and controlling the electrical machine (56, 58) to operate in a fault condition, in which the remaining phases of the electrical machine (56, 58) provide the electrical power requirement; and providing an overrating signal to a flight computer (66) of the aircraft (2) where the power provided by each phase exceeds the power rating of the respective phase.

20 Claims, 3 Drawing Sheets

(56) References Cited

U.S. PATENT DOCUMENTS

2012/0249029 A1 10/2012 Cullen
2012/0256572 A1 10/2012 Oyori et al.

FOREIGN PATENT DOCUMENTS

| | | |
|---|---|---|
| EP | 2 372 901 A2 | 10/2011 |
| EP | 2 617 998 A2 | 7/2013 |
| WO | 2011/069801 A1 | 6/2011 |

OTHER PUBLICATIONS

Nov. 6, 2013 Search Report issued in British Application No. GB 1306565.1.

Apr. 14, 2016 European Search Report issued in EP 14 16 3813.

* cited by examiner

AIRCRAFT ELECTRICAL SYSTEM OPERATING METHOD

FIELD OF THE INVENTION

The present invention relates to an aircraft electrical system, and to a method of controlling an aircraft electrical system to provide fault tolerant operation.

BACKGROUND TO THE INVENTION

Aircraft such as passenger aircraft comprise a number of powered systems, such as control surface actuators, passenger air systems and avionics. In traditional aircraft, some of these systems are electrically powered, while others are pneumatically or hydraulically powered. Aircraft engines, such as gas turbine engines, also comprise a number of powered accessory systems, such as fuel and oil pumps, which are powered by the engine itself. In recent years, there has been a move to provide electrically powered systems for aircraft and aircraft engine accessory systems to replace some or all of the pneumatic or hydraulic systems in order to save weight or reduce fuel burn, or a combination of the two. Aircraft having more electrical systems compared to traditional aircraft are known as "More Electric Aircraft" (MEA), whereas aircraft engines having more electrically powered accessory systems are known in the art as "More Electric Engines" (MEE).

In the case of an MEE, where the engine accessory is required for continued operation of the engine, such as where the engine accessory comprises the fuel or oil pump, a fault within the electrical system may result in an undemanded drop in power and consequently a loss of thrust control, or possibly an engine shutdown. It is usually a requirement of engine and aircraft certification that a single electrical failure in a single component does not result in loss of thrust control or an engine shutdown. Consequently, where essential engine accessory systems are electrically powered, such accessory systems may require redundancy, i.e. multiple independent systems, in order to prevent a fault with a single system from resulting in loss of thrust control. Such redundancy however increases weight and costs to the extent that the advantages of an MEE may not be realised.

In a separate field of endaevaour, fault tolerant electrical machines are known. Fault tolerant electrical machines are electrical machines which are configured to continue working even if a failure occurs. One type of fault tolerant electrical machine comprises a multi-phase alternating current (AC) electrical machine, such as a generator or motor. "Fault Tolerant Electrical Machines—State of the Art and Future Directions" by Mircea Ruba and Lorand Szabo, published by the Technical University of Cluj, describes an electrical machine control system for controlling a fault tolerant switched reluctance electrical machine (SRM). When a fault condition such as an open or short circuit is sensed, the controller increases the current in the remaining phases to compensate. However, in order for the electrical machine to able to continue operating in the fault condition, it is necessary to rate each phase to cope with the power and cooling requirements for the fault condition. Consequently, conventional fault tolerant electrical machines must be relatively large, and therefore heavy and expensive.

The present invention describes an aircraft electrical system and a method of controlling an aircraft electrical system which seeks to overcome some or all of the above problems.

SUMMARY OF THE INVENTION

According to a first aspect of the present invention, there is provided a method of controlling an aircraft electrical system, the electrical system comprising: an alternating current electrical machine comprising a plurality of electrical phases, each phase having a nominal power rating, the electrical machine being configured to operate on failure of one or more phases; the method comprising:
  determining a power requirement;
  sensing a fault of one or more phases of the electrical machine, and, where a fault is sensed:
  controlling the electrical machine to operate in a fault condition, in which the non-faulty phases of the electrical machine provide the electrical power requirement; and
  providing an overrating signal to a flight computer of the aircraft where the power provided by each phase exceeds the power rating of the respective phase.

The inventor has recognised that, in the event that a fault develops in one of the phases of the electrical machine, the non-faulty phases can be overrated (i.e. can provide more than their nominal rated power) for a limited period of time which may for example be limited by the thermal mass of the machine. Consequently, the phases of the electrical machine can be sized for normal operation, and can be overrated for a limited period of time when operated in a fault condition. Consequently, the electrical machine can be smaller, lighter and less expensive compared to previous designs. By providing a signal to the flight computer that one or more phases of the electrical machine is being operated at a power level greater than its respective nominal rated power, action can be taken by the auto-pilot or by the flight crew such that the electrical machine is operated at a level above the nominal rated power for only a limited period of time. The invention thereby provides a method of controlling an aircraft electrical system in such a way that undemanded loss of thrust control is prevented, while enabling the use of a relatively light weight electrical machine.

The alternating current electrical machine may comprise an electrical motor, and the power may comprise mechanical power provided by the electrical motor. Alternatively or in addition, the alternating current electrical machine may comprise an electrical generator, and the power may comprise electrical power provided by the electrical generator. Where the electrical machine comprises an electrical motor, the motor may be configured to drive an engine fluid pump, such as a fuel pump or oil pump, or may be configured to drive any of an oil breather centrifuge, or an electro-hydraulic engine actuator. Advantageously, the invention provides a method of operation that enables fault tolerant operation of critical components such as electrical motors driving engine fluid pumps and actuators, or electrical generators.

Each electrical phase of the alternating current electrical machine may be one or more of magnetically, electrically and thermally isolated from each of the other phases. Advantageously, a failure of one phase will not result in a "cascading failure" of the other phases.

The fault may be sensed on the basis of a measurement of any of current flow or voltage of each electrical phase. For example, the fault may be sensed using one or more of overcurrent protection, ground (earth) fault protection, unit (or differential) protection and negative phase sequence protection. The fault may be sensed by one or more of a current transformer and a voltage transformer or digital equivalents.

Where the power provided by each electrical phase exceeds the power rating of the respective phase, the method may comprise overrating the non-faulty phases until either a normal operation condition or a reversion condition is met. The non-faulty phases may be overrated by a switching device such as one or more of a solid state power controller, contactor, relay and isolators. If the normal operation condition is met, the method may comprise restoring each faulty phase of the electrical machine, and if the reversion condition is met, the method may comprise reducing the power provided by each non-faulty phase to the rated power, or below the rated power. Consequently, the electrical machine is only operated above its nominal rated power for a relatively short period of time, after which the electrical machine is either returned to normal operation, or operated at a reduced power relative to the overrated power.

The reversion condition may be met where a predetermined period of time has elapsed from the phases exceeding their nominal rated power. The predetermined period of time may be calculated on the basis of a measured temperature of the electrical system or a part of the electrical system. Alternatively, the reversion condition may be met when a predetermined temperature of the electrical system or a part of the electrical system is reached or exceeded. The reversion condition may also be met where the required power is less than the nominal rated power of the non-faulty phases of the electrical machine.

The normal operation condition may be met where the each of the phases of the electrical machine is sensed to no longer have a fault. Advantageously, the system can accommodate transient faults in the electrical system, due to, for example, software or sensing errors. The electrical phases of the electrical machine may be sensed to no longer have a fault by detecting a drop in measured current. The drop in current may be measured by a sensor reset.

Alternatively, or in addition, the normal condition may be met where the respective phase fault detection is found to have been erroneous. For example, the method may comprise detecting that the fault occurred on a further electrical component, such as a DC link/ring main. Where the fault is found to be on a further electrical component, the method may comprise isolating the further faulty component, and subsequently operating the electrical machine in the normal condition. Advantageously, the method allows the electrical machine to be operated above the nominal power rating for a period of time while the fault is fully diagnosed. If the fault is found to be caused to a further electrical component, i.e. by a component other than one of the electrical phases of the electrical machine, then the electrical machine can be operated in the normal condition. Advantageously, the electrical machine can be continuously operated while the fault is diagnosed without resulting in an undemanded loss in thrust.

Where the electrical machine comprises an electrical motor configured to drive one of an oil pump and a fuel pump, the method may further comprise sensing the relative oil and fuel pressures, and operating the respective pumps to maintain a higher oil pressure relative to the fuel pressure. Advantageously, fuel is prevented from leaking into the oil system in the event there is a leak in the fuel oil heat exchanger for example where the system is operated in the reversion mode.

According to a second aspect of the present invention there is provided an electrical system for an aircraft, the system comprising: an alternating current electrical machine comprising a plurality of phases, each phase having a nominal power rating, the electrical machine being configured to operate on failure of one or more phases, and a controller, the controller being configured to operate the electrical system in accordance with the method of the first aspect of the invention.

According to a third aspect of the invention, there is provided an aircraft comprising an electrical system in accordance with the second aspect of the invention.

DETAILED DESCRIPTION

Figure 1:
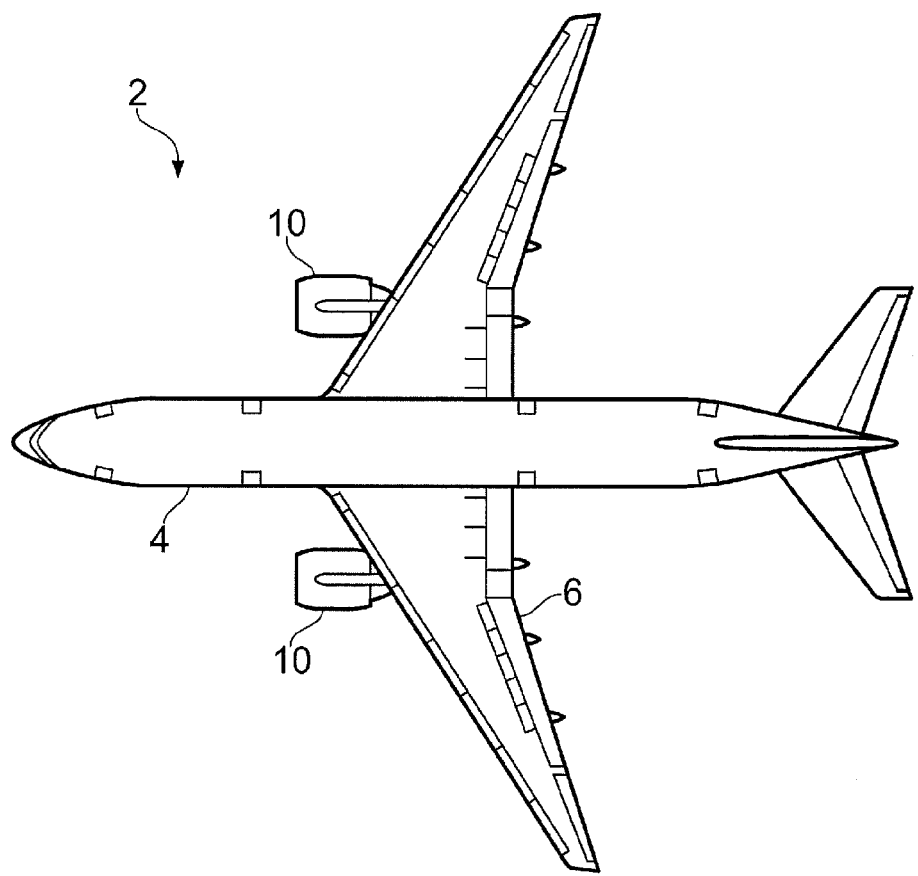
FIG. 1 shows an aircraft.

FIG. 1 shows a passenger aircraft 2. The aircraft 2 is of conventional construction, having a fuselage 4, wings 6, and a pair of wing mounted engines 10.

Figure 2:
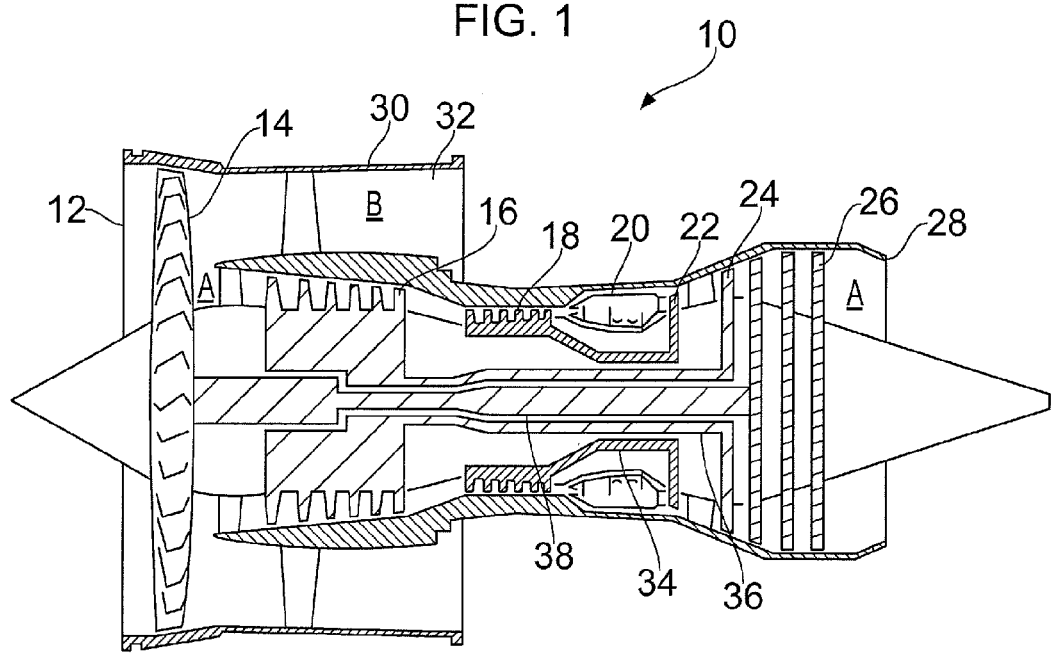
FIG. 2 shows a gas turbine engine.

FIG. 2 shows a cross sectional schematic view of one of the engines 10. The engine 10 comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. The high pressure turbine 22 is mechanically coupled to the high pressure compressor 18 by a high pressure shaft 34, the intermediate pressure turbine 24 is mechanically coupled to the intermediate pressure compressor 16 by an intermediate pressure shaft 36, and the low pressure turbine 26 is mechanically coupled to the fan 14 by a low pressure shaft 38. A nacelle 30 surrounds the gas turbine engine 10 and defines, in axial flow B, a bypass duct 32.

Figure 3:
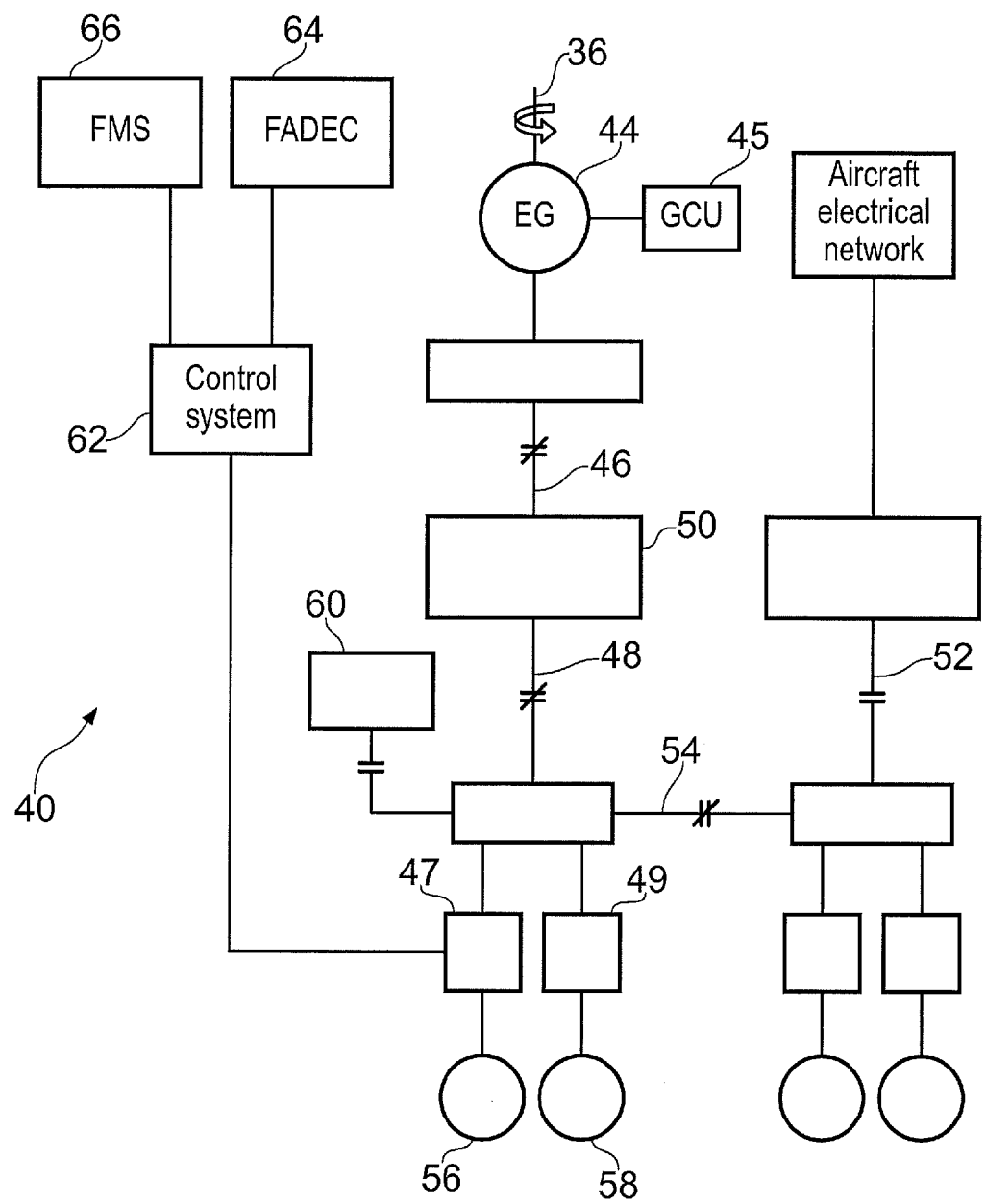
FIG. 3 shows an electrical diagram for an electrical system for the aircraft of FIG. 1.

The engine 10 further comprises an electrical system 40, as shown schematically in FIG. 3. The electrical system 40 comprises an engine electrical network 42 comprising an electrical machine in the form of a multi-phase alternating current electrical generator 44. Typically, the generator 44 comprises a wound field machine with a contactless exciter system. In this example, the generator 44 comprises a three phase machine. The generator 44 is controlled by a generator control unit (GCU) 45. The electrical generator 44 is mechanically driven by one of the shafts of the gas turbine engine (in this example, the generator 44 is driven by the intermediate pressure shaft 36), and is contained within the nacelle 30.

The electrical generator 44 provides an AC current to an engine AC electrical bus 46. The engine AC bus 46 provides power to variable AC engine electrical loads that would accept variable frequency AC power, such as heating pads (not shown). The engine AC bus 46 is connected to an engine DC bus 48 by an AC/DC converter 50.

The engine DC bus 48 is could include some level of redundancy (not shown for simplicity). For example, this could be in the form of a double bus bar (as is commonly used in the power industry), with a main and reserve DC bus. Should there be a fault affecting the main bus, loads and power sources could be switched to the other bus using a combination of circuit breakers and isolators. In addition the system could be set up to normally use both the main and reserve bus with loads roughly evenly shared, in the event of a fault less loads need to be moved. Alternatives to this DC bus approach include mesh arrangements or DC rings which can lead to fewer switching devices at the expense of protection options. In addition there may be two cable runs to each motor controller to offer redundancy, or each phase in the machine could have its own connection to the DC link.

The engine DC bus 48 is also electrically connected to an auxiliary power source 60, which may comprise a battery or a further gas turbine engine.

The engine DC bus 48 is connected to one or more engine accessories in the form of electrical machines. In the described embodiment, the electrical machines comprise first and second electrical motors 56, 58, which are configured to drive a fuel pump and an oil pump respectively for the gas turbine engine 10. Both the fuel pump and oil pump are considered to be critical items, since failure of either of these will result in an engine shutdown. Alternatively, partial failure of these critical items, such as a sudden reaction in capacity may result in an undemanded loss of thrust.

The electrical motors 56, 58 comprise AC motors such as permanent magnet motors, having a plurality of electrically, magnetically and thermally isolated electrical phases. In a preferred embodiment, each electrical motor 56, 58 comprises at least four or more independent electrical phases. The motors 56, 58 are driven by AC current, which is provided by a respective motor controller 49 which is in turn powered by the DC bus 48. Each phase of each motor 56, 58 has a nominal power rating, i.e. a maximum mechanical power that can be provided by each phase of the respective motor 56, 58, and/or a nominal electrical power that can be transmitted through each phase. The nominal power rating determines the size, weight and cooling requirements of the motor 56, 58. The nominal power rating is determined such that the respective electrical motor 56, 58 can provide a maximum power that might be required by the FADEC for normal operation, when all of the phases of the respective electrical motor are functional, i.e. none of the phases is sensed to be faulty.

Each of the first and second electrical motors 56, 58 is controlled by a fault tolerance controller 62. The fault tolerance controller 62 is in signal communication with a FADEC 64, and a flight computer in the form of a Flight Management System (FMS) and/or the Engine Indication and Crew Alerting System (EICAS, sometimes referred to as the Electronic Centralised Aircraft Monitor, ECAM) 66. The FADEC 64 is an electrical computer configured to control fuel flow and other engine parameters in response to a command from the FMS 66. During operation, the electrical motors 56, 58 are controlled by the controller 62 in response to a respective required fuel and oil flow demanded by the FADEC 64. The fault tolerance controller 62 could be a separate physical item, or could be implemented in software in either the FADEC 64 or FMS 66 or the motor controllers 49.

Figure 4:
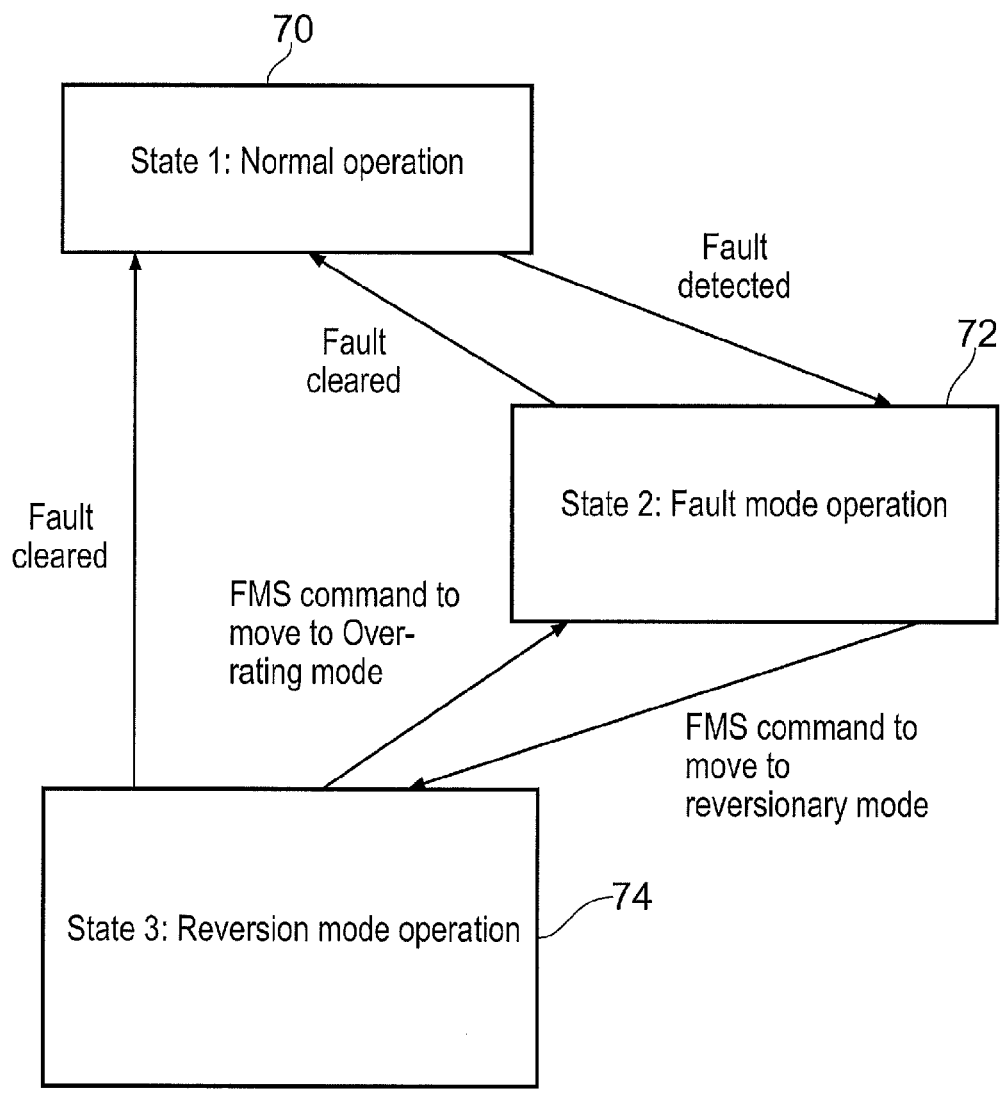
FIG. 4 shows a control diagram for a first method of controlling the electrical system of FIG. 3.

Referring to FIG. 4, the electrical system 40 is operated as follows.

The system 40 is initially operated in a normal operation mode (box 70 in FIG. 4). In the normal mode, all phases of each electrical motor 56, 58 are operated. The electrical motors 56, 58 are operated by the controller 62 to provide a mechanical power required to maintain the required fuel and oil flows as commanded by the FADEC 64 and FMS 66. When operated in the normal mode, each of the phases of each motor 56, 58 is maintained at or below its nominal rated power.

A fault sensor (not shown) continuously monitors each of the motors 56, 58 to determine whether a fault is present in any of the phases of either motor 56, 58. If a fault is detected, i.e. one of the phases is found to be faulty, a signal is sent to the controller 62, and the controller 62 switches the operation of the system 40 to a fault mode (box 72 in FIG. 4). The fault sensor is a conventional electrical fault sensor as known in the art, and senses a fault such as an open or short circuit of one or more of the phases by continuously monitoring the voltage and/or current of the respective phases. Examples of suitable fault sensors include current transformers and voltage transducers.

When the system 40 is operated in the fault mode, the faulty phase detected by the sensor is disabled by respective motor controller 49 in response to a signal sent from the fault tolerant controller 62, such that the faulty phase is electrically isolated from the remainder of the engine DC bus 48. The power provided by the remaining phases on the respective motor 56, 58 is increased, such that the remaining phases provide the mechanical required power, as determined by the FADEC 64 and FMS 66, in order to provide the required oil or fuel flow.

A power sensor (not shown) or a state output from the motor controller 49 would indicate the electrical and/or mechanical power provided by each phase of each electrical motor 56, 58. If any one electrical phase exceeds the nominal power rating of that phase as a result of operation in the fault mode, then an overrate signal is transmitted to the FMS 66 by the controller 62. However, both electrical motors continue to operate at the increased power level.

The electrical system 40 continues to operate in the fault mode until one of a normal operation condition and a reversion condition is met.

The normal operation condition is met where the fault sensor determines that the faulty phase is no longer faulty. This could occur for example, where the sensor has initially made an erroneous reading, or where the fault is transient. Where the normal operation condition is met, the previously faulty phase is restored, and the system is operated in the normal operating mode 70.

On the other hand, the reversion condition may be met where a predetermined operating condition of the electrical machine is met. For example, the predetermined operating condition could comprise a predetermined time elapse from the or each phase exceeding their respective rated power, i.e. the controller 62 monitors the period of time in which the motors 56, 58 are operated at above the nominal rated power. It has been found that multi-phase fault tolerant electrical machines can generally reliably operate above their rated power (for example at 125% of their rated power) for a predetermined period of time. In one example, it has been found that the predetermined period of time can be up to 5 minutes.

Alternatively, the predetermined operating condition could be a function of temperature. For example, the predetermined operating condition could be a set temperature of the respective electrical motor 56, 58, above which the reversion condition is satisfied, or the time period may be determined on the basis of a function related to temperature, with higher temperatures generally resulting in a shorter predetermined time period. This would be particularly advantageous, as the system 40 may operate over a relatively large range of conditions, and the overrating of the electrical phases may in some cases be extended compared to a worst case situation.

As a further alternative, the reversion condition may be met where the required power no longer exceeds the rated power of the phases. This may occur where, for example, the FMS 66 or FADEC 64 commands a lower fuel or oil flow, such that the remaining phases are capable of providing the required power without exceeding their respective nominal rated power.

Once the reversion condition is met, the electric motors 56, 58 are operated in a reversion mode (box 74). When operated in the reversion mode 74, the motors 56, 58 are maintained at or below their rated power by the controller 62. In other words, the system 40 is only operated in the fault mode at a power greater than the nominal power rating for a limited period of time, before reverting to a lower power rating.

When in the reversion mode, the fuel pump 56 and oil pump 58 are operated such that a higher oil pressure is maintained relative to the fuel pressure. This ensures that fuel does not leak into the oil system. For example, where the fault is detected in the oil pump, the oil pump may be operated at a below normal rating when operated in the reversion mode 74. Consequently, the controller 62 also de-rates the fuel pump to reduce the pressure in the fuel system.

Where commanded by the FMS 66, the controller 62 may then again operate the system 40 in the fault mode, for example where the reversion condition is no longer met, or where a higher fuel flow is commanded by the FMS or by the flight crew. Again though, the system 40 is then operated in the fault mode 72 for a limited period until one or more reversion condition is met. On the other hand, if the faulty phase is found to be no longer faulty, the fault is cleared, and the system 40 is operated in the normal mode 70. The flight deck could also authorise continued operation in the fault mode, i.e. overriding the reversion condition, where it is accepted that there would be a decrease in life of the fuel pump, through increased insulation life degradation—in this case the pump would need to be designed to handle the increased temperature, but with a decreased life expectancy if operated in this mode. This would only likely be used in emergencies.

Consequently, the operating method allows the auto-pilot or flight crew to take action such as steadily reducing engine thrust where a fault is detected in one or more of the phases. On the other hand, the system permits lighter, less expensive electric motors 56, 58, compared to previously proposed fault tolerant systems, while still complying with aircraft engine certification requirements.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the electrical system could comprise further electrical machines comprising motors provided to drive other critical or non-critical engine functions, such as an oil breather centrifuge, or an electro-hydraulic engine actuator, each further motor being controlled by the controller 62.

As previously mentioned, the electrical generator 44 provides an AC current to the engine bus 46. The generator 44 could also comprise a fault tolerant electrical machine architecture, having a plurality of magnetically, electrically and thermally isolated phases. In such a situation, the system may comprise a fault sensor configured to detect a fault in one of the phases of the generator 44, and the controller 62 may be configured to also control the electrical generator to shutdown the faulty phase, increase the power provided by the remaining non-faulty phases of the generator 44 to provide the remaining power, determine whether the power provided by each remaining phase of the generator 44 exceeds the power rating of the respective phase, and provide a signal to the FMS 66 indicating that the power provided by one or more phases exceeds the rated power. The generator 44 could be operated in the normal, fault and reversion modes, as described above in relation to the motors 56, 58.

The invention claimed is:

1. A method of controlling an aircraft electrical system, the electrical system comprising: an alternating current electrical machine comprising a plurality of electrical phases, each phase having a nominal power rating, the electrical machine being configured to operate on failure of one or more phases; the method comprising:
   determining a power requirement;
   sensing a fault of one or more phases of the electrical machine, and, where a fault is sensed:
   controlling the electrical machine to operate in a fault condition, in which the non-faulty phases of the electrical machine provide the electrical power requirement; and
   determining whether the power provided by the remaining non-faulty electrical phases exceeds the nominal power rating of the respective phase, and providing an overrating signal to a flight computer of the aircraft where the power provided by each phase exceeds the nominal power rating of the respective phase.

2. A method of controlling an aircraft electrical system according to claim 1, wherein the alternating current electrical machine comprises an electrical motor, and the power comprises mechanical power provided by the electrical motor.

3. A method of controlling an aircraft electrical system according to claim 2, wherein the electrical motor is configured to drive an engine fluid pump, such as a fuel pump or oil pump.

4. A method of controlling an aircraft electrical system according to claim 1, wherein the alternating current electrical machine comprises an electrical generator, and the power comprises electrical power provided by the electrical generator.

5. A method of controlling an aircraft electrical system according to claim 1, wherein the fault is sensed on the basis of a measurement of any of current flow or voltage of each phase.

6. A method according to claim 5, wherein the fault is sensed using one or more of overcurrent protection, ground fault protection, unit protection and negative phase sequence protection.

7. A method according to claim 5, wherein the fault is sensed by one or more of a current transformer and a voltage transformer or digital equivalents.

8. A method of controlling an aircraft electrical system according to claim 1, wherein where the power provided by each phase exceeds the power rating of the respective phase, the method comprises overrating the remaining phases until either a normal operation condition or a reversion condition is met.

9. A method according to claim 8, wherein if the normal operation condition is met, the method may comprise restoring the or each non-operational phase of the electrical machine.

10. A method according to claim 8, wherein if the reversion condition is met, the method comprises reducing the power provided by each remaining phase to the rated power, or below the rated power.

11. A method according to any of claim 8, wherein the reversion condition is met where a predetermined period of time has elapsed from the phases exceeding their rated power.

12. A method according to claim 11, wherein the predetermined period of time is calculated on the basis of a measured temperature of the electrical system or a part of the electrical system.

13. A method according to any of claim 8, wherein the reversion condition is met where the electrical system or a part of the electrical system reaches a predetermined temperature.

14. A method according to any of claim 8, wherein the reversion condition is met where required power is less than the rated power of the remaining phases of the electrical machine.

15. A method according to any of claim 8, wherein the normal operation condition is met where each of the phases of the electrical machine is sensed to no longer have a fault.

16. A method according to any of claim 8, wherein the normal condition is met where the respective phase fault detection is found to have been erroneous.

17. A method according to claim 16, wherein the method comprises detecting that the fault occurred on a further electrical component.

18. A method according to claim 17, wherein where the fault is found to be on a further electrical component, the method comprises isolating the further faulty component, and subsequently operating the electrical machine in the normal condition.

19. A method according to claim 3, further comprising sensing relative oil and fuel pressures of fuel and oil systems of the aircraft engine, and operating the respective pumps to maintain a higher oil pressure relative to the fuel pressure.

20. An electrical system for an aircraft, the system comprising: an alternating current electrical machine comprising a plurality of phases, each phase having a power rating, the electrical machine being configured to operate on failure of one or more phases, and a controller, the controller being configured to operate the electrical system in accordance with the method of claim 1.

* * * * *